United States Patent
Shibamiya

(10) Patent No.: US 6,795,130 B2
(45) Date of Patent: Sep. 21, 2004

(54) SIGNAL RECEIVING APPARATUS, REMOTE CONTROLLER, SIGNAL RECEIVING SYSTEM, AND APPARATUS TO BE CONTROLLED

(75) Inventor: Yoshikazu Shibamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 09/917,879

(22) Filed: Jul. 31, 2001

(65) Prior Publication Data

US 2002/0021373 A1 Feb. 21, 2002

(30) Foreign Application Priority Data

Aug. 4, 2000 (JP) .................................. 2000-236936

(51) Int. Cl.⁷ .............................................. H04N 5/44
(52) U.S. Cl. ...................... 348/734; 348/553; 348/552; 348/460; 348/14.05
(58) Field of Search ................................ 348/734, 552, 348/553, 731, 732, 460, 567, 14.04, 14.05, 14.12; 725/133, 141, 148; 455/92, 88, 353, 419, 420, 151.1, 151.4, 3.03, 3.05, 3.06; 340/825.27, 825.22; 341/176

(56) References Cited

U.S. PATENT DOCUMENTS

| | | | | |
|---|---|---|---|---|
| 5,726,645 A | * | 3/1998 | Kamon et al. ......... | 340/825.22 |
| 6,005,490 A | * | 12/1999 | Higashihara ........... | 340/825.72 |
| 6,128,484 A | * | 10/2000 | Singkornrat et al. ......... | 455/420 |
| 6,133,847 A | * | 10/2000 | Yang ..................... | 340/825.22 |
| 6,219,109 B1 | * | 4/2001 | Raynesford et al. ........ | 348/734 |
| 6,255,961 B1 | * | 7/2001 | Van Ryzin et al. ..... | 340/825.25 |
| 6,313,887 B1 | * | 11/2001 | Gudorf ...................... | 348/734 |
| 6,424,947 B1 | * | 7/2002 | Tsuria et al. ................... | 705/1 |
| 6,456,330 B1 | * | 9/2002 | Hirai .......................... | 348/460 |
| 6,532,592 B1 | * | 3/2003 | Shintani et al. ............. | 725/141 |
| 6,556,771 B1 | * | 4/2003 | Kim ........................... | 386/83 |
| 6,577,849 B1 | * | 6/2003 | Eaton et al. ................ | 455/3.01 |
| 6,590,618 B1 | * | 7/2003 | Park et al. ................... | 348/734 |

* cited by examiner

Primary Examiner—Michael H. Lee
Assistant Examiner—Jean W. Désir
(74) Attorney, Agent, or Firm—Fitzpatrick, Cella, Harper & Scinto

(57) ABSTRACT

A signal receiving apparatus of the present invention has a receiver for receiving television signals, a processor for processing the television signals received by the receiver to obtain image signals, a display unit for displaying images according to the image signals obtained by the processor, a transmitting and receiving unit for receiving information sent from the remote controller and transmitting information to the remote controller, and a control unit for performing control operations so as to transmit setting information concerning operation setting conditions of the receiver to the remote controller in accordance with a command associated with a manipulation of a predetermined key, which is transmitted from the remote controller.

20 Claims, 12 Drawing Sheets

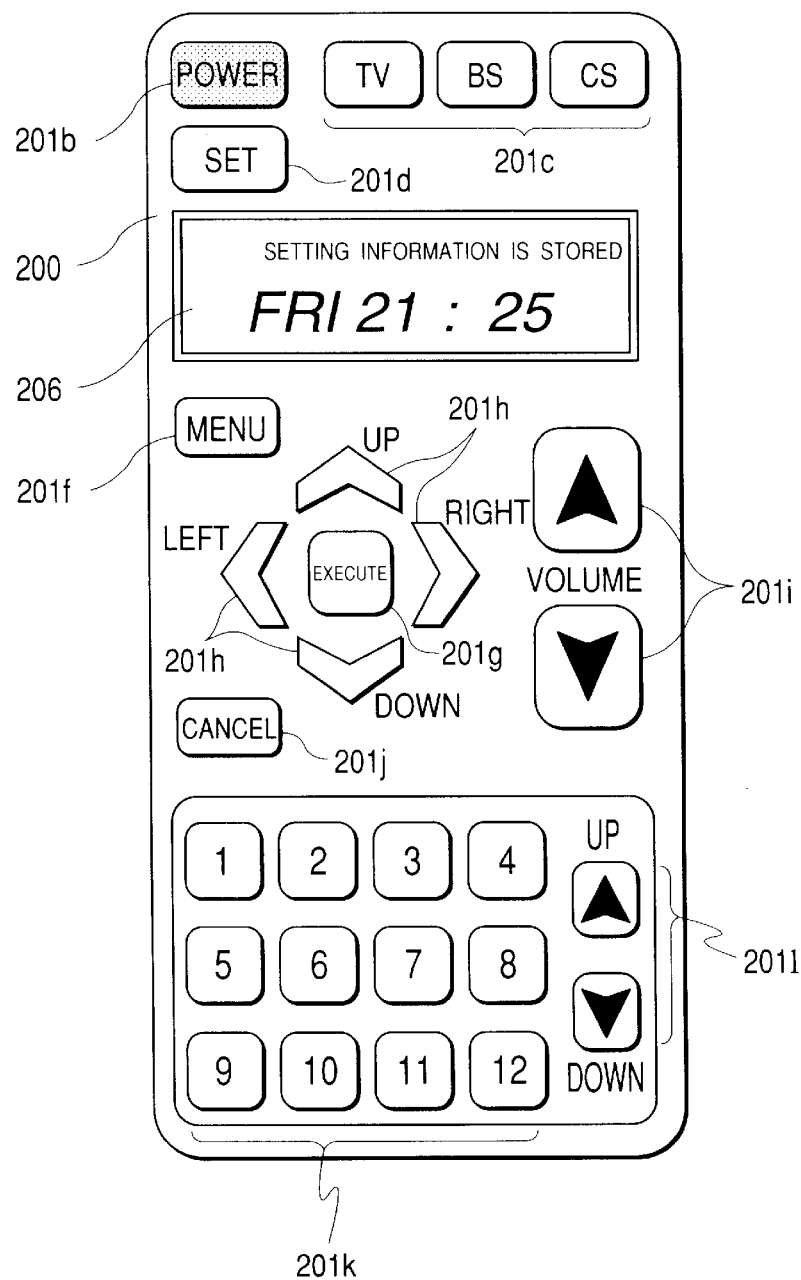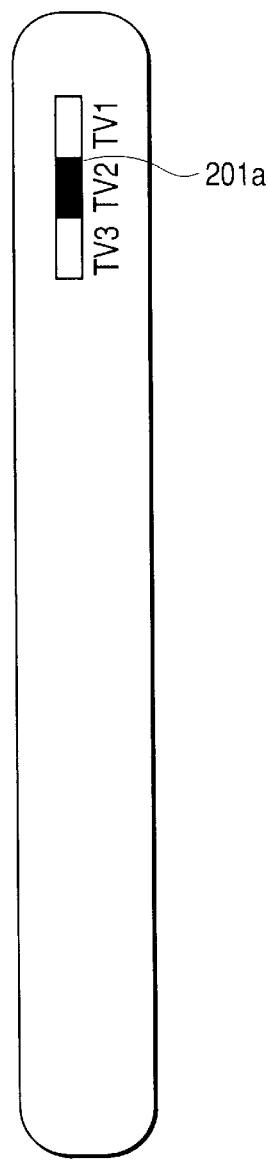

| TV BROADCAST | BS |
|---:|:---:|
| TV CHANNEL | 16 |
| DATA BROADCAST CHANNEL | 29 |
| AUDIO MODE | STEREO |
| ⋮ | ⋮ |

SIGNAL RECEIVING APPARATUS, REMOTE CONTROLLER, SIGNAL RECEIVING SYSTEM, AND APPARATUS TO BE CONTROLLED

BACKGROUND OF THE INVENTION

1. Field of the Invention

The present invention relates to a signal receiving apparatus, a remote controller, a signal receiving system, and an apparatus to be controlled, and more particularly, to processing operations used in controlling a plurality of devices by a common controller.

2. Related Background Art

Conventionally, it is widespread practice to control electronic devices such as television receivers (hereinafter referred to as TV receivers) or the like using a remote controller utilizing infrared rays or the like.

In such TV receivers, the number of items to be set upon viewing has been increasing recently in conjunction with an increase in the number of channels involving BS broadcasting, CS broadcasting, etc., starts of new services such as data broadcasting or the like, and so on.

On the other hand, price reduction of TV receivers and development in individuality has been promoting transition from the era of only one TV located in a living room to the era of one TV per room.

Under such circumstances, there are cases wherein the same broadcast program is viewed after a user has moved from one room to another (e.g., after the user has moved from the living room to a bedroom).

In such cases, in order to view the same broadcast program, it was necessary for the user to remember settings concerning the broadcast program being viewed, including a channel, and to again program the settings based on the remembered information after a TV receiver at another room was powered up.

It is, however, often the case that the user fails to remember all the many setting items, as described above. It is not uncommon for the user to forget even only the channel alone after a lapse of some time.

Accordingly, the user has to again perform program searching and tuning to select the channel and to again program the other settings, e.g., settings concerning the quality of image, audio processing, and so on.

SUMMARY OF THE INVENTION

Under the above background, the present invention has been accomplished in order to solve the foregoing problem and an object of the invention is to enable easy implementation of optimal operation setting between a plurality of devices to be controlled.

In order to achieve the above object, the present invention presents, as one scope thereof, a signal receiving apparatus controlled by a remote controller, comprising:

signal receiving means for receiving television signals;

processing means for processing the television signals received by the signal receiving means, to obtain image signals;

display means for displaying images according to the image signals obtained by the processing means;

transmitting and receiving means for receiving information transmitted from the remote controller and transmitting information to the remote controller; and control means for performing such control as to transmit setting information concerning operation setting conditions of the signal receiving apparatus to the remote controller in accordance with a command associated with a manipulation of a predetermined key, which is transmitted from the remote controller.

Other objects and features of the present invention will become apparent from the detailed description of the preferred embodiments of the invention referring to the drawings which will follow.

BRIEF DESCRIPTION OF THE DRAWINGS

FIGS. 4A and 4B are views showing the appearance of the remote control device shown in FIG. 3;

DETAILED DESCRIPTION OF THE PREFERRED EMBODIMENTS

The embodiments of the present invention will be described below with reference to the drawings.

Figure 1:
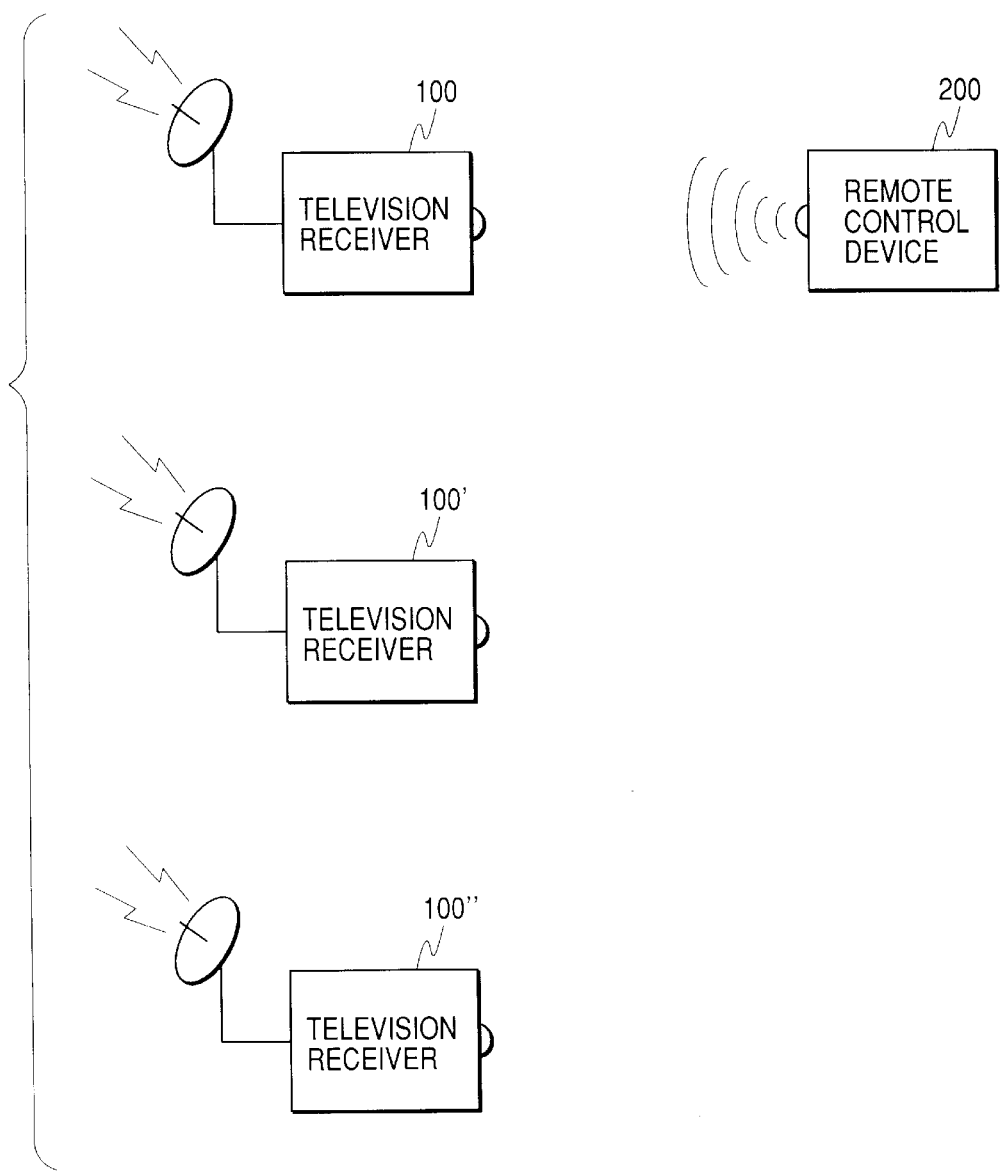
FIG. 1 is a diagram showing a configuration of a signal receiving system to which the present invention is applied.

FIG. 1 is a block diagram showing a configuration of a signal receiving system according to an embodiment of the present invention.

In FIG. 1, reference labels 100, 100', and 100" denote respective TV receivers, which perform reception of TV broadcast signals, transmission/reception of data to or from a remote control device 200, transmission/reception of data to or from devices connected to a network (not shown), control of devices, etc., and which display TV image data, device image data, various icon data, control information, etc., obtained by these processes.

In FIG. 1, these three TV receivers are assumed to be located at respective rooms different from each other.

Numeral 200 designates a remote commander (hereinafter referred to as a remote controller), which is used for controlling and operating each of the TV receivers 100, 100', 100".

Each TV receiver of FIG. 1 will be described below.

Figure 2:
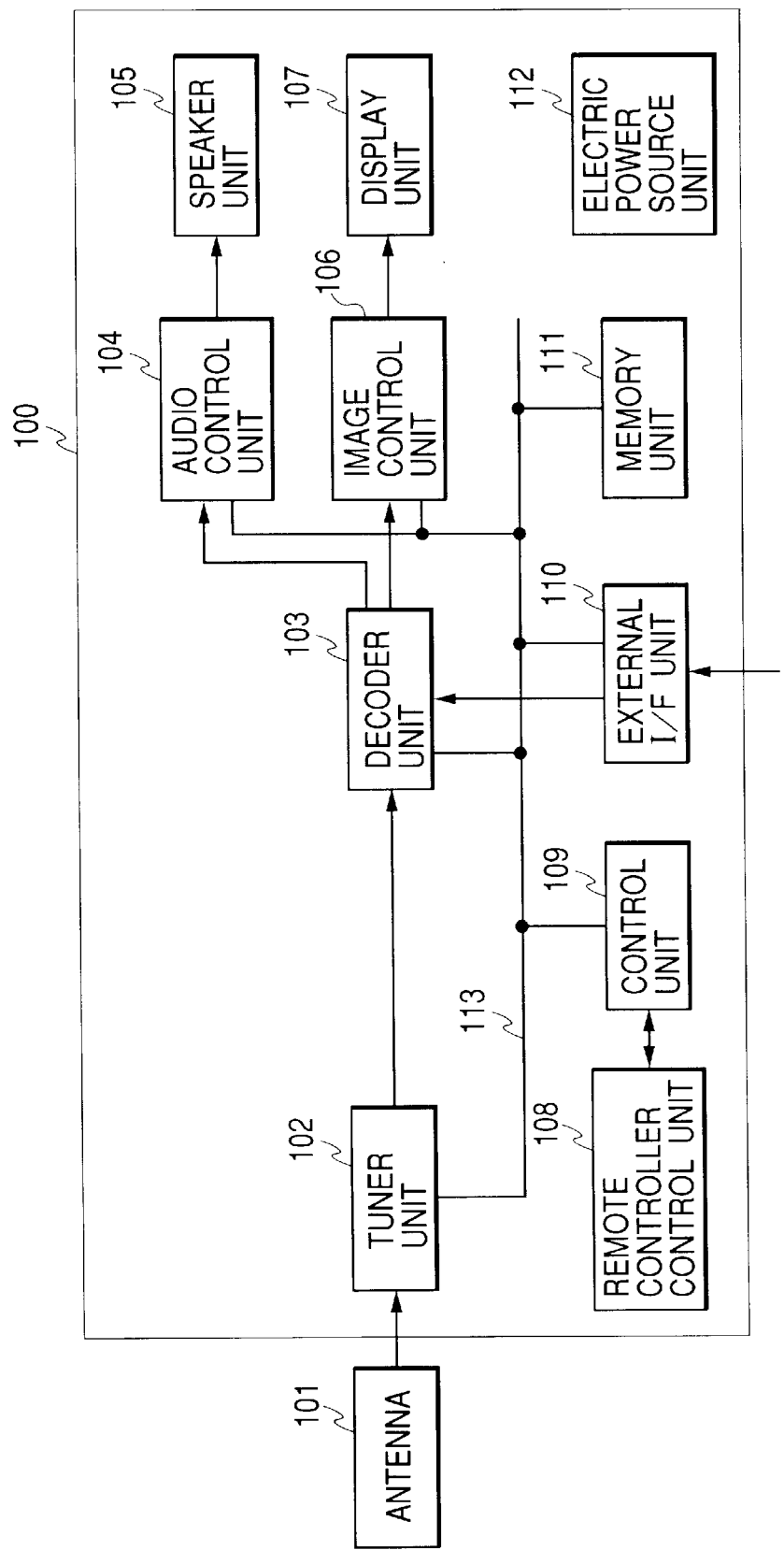
FIG. 2 is a diagram showing a configuration of a signal receiving device to which the present invention is applied.

FIG. 2 is a diagram showing a configuration of the TV receiver 100 of FIG. 1.

In FIG. 2, an antenna 101 receives TV broadcast signal waves from the environment, converts the TV broadcast signal waves to high-frequency electric signals, and outputs them to a tuner unit 102. The tuner unit 102 selects a desired station in accordance with a control signal from a control unit 109, further demodulates the high-frequency TV signals modulated by a carrier wave, and outputs the thus demodulated signals to a decoder unit 103.

In accordance with a control signal from the control unit 109, the decoder unit 103 selects image data and audio data of a desired program out of the TV signals output from the tuner unit 102 and separates additional data such as other data-broadcasting data, electronic program guide data, and the like therefrom. Then the decoder unit 103 decodes each data and sends the image data to an image control unit 106, the audio data to an audio control unit 104, and the other data through a bus 113 to the control unit 109.

The image control unit 106 switches between the image data from the decoder unit 103 and image data obtained through the bus 113, or combines them, and further generates display image data together with horizontal and vertical synchronizing signals to output the generated data to a display unit 107. The display unit 107 displays images according to the image data supplied from the image control unit 106.

The audio control unit 104 switches between the audio data from the decoder unit 103 and audio data obtained through the bus 113, or combines them, and further controls the volume, quality, presence, etc., of sound in accordance with a control signal from the control unit 109 to output the audio data to a speaker unit 105.

Numeral 110 designates an external I/F unit, which performs transmission/reception of data to or from various external devices, personal computers, and so on.

Numeral 108 represents a remote controller control unit, which receives various command data transmitted upon user's manipulation on the remote controller 200 to transfer the data to the control unit 109, and which transmits data such as TV receiver setting data or the like, as described hereinafter, to the remote controller 200.

Numeral 111 denotes a memory unit, which accepts through the bus 113 and stores the data of various settings and control transmitted from the remote controller 200, the data of operation setting conditions of the TV receiver 100, various TV broadcast additional data output from the decoder unit 103, and various data input through the external I/F unit 110.

Numeral 112 indicates an electric power source unit, which supplies a working power to the TV receiver 100 and which is controlled by the control unit 109. Numeral 109 represents a control unit, which totally controls each circuit unit of the TV receiver 100 through the bus 113.

In the TV receiver 100, when receiving TV broadcasting, the control unit 109 controls the antenna unit 101, the tuner unit 102, and the decoder unit 103 in accordance with a control command from the remote controller 200 to perform setting and control operations such as channel switching, storage of the data-broadcasting data and the electronic program guide data, and so on.

The control unit 109 also controls the image control unit 106 to perform display setting and control operations such as switching between the image data from the decoder unit 103 and the aforementioned data-broadcasting data, electronic program data, or the data from the external I/F unit 110, the composition thereof, and so on.

Similarly, the control unit 109 controls the audio control unit 104 to perform synthesis and output control of audio data, using the audio data from the decoder unit 103 or the audio data output from the external I/F 110.

The remote controller control unit 108 receives a command transmitted from the remote controller 200 and outputs it to the control unit 109. The control unit 109 performs these setting and control operations in accordance with the control command from the remote controller 200.

The control unit 109 also controls the remote controller control unit 108 to transmit data to the remote controller 200 according to the reception result of data received from the remote controller control unit 108, or according to change in the situation of the interior of the TV receiver 100 and/or information from the external I/F 110. When the power is turned off, the power is shut down to all the units except for the control unit 109 and the remote controller control unit 108.

TV receivers 100' and 100" in FIG. 1 have a structure substantially similar to the TV receiver 100, but the TV receiver 100" is assumed not to be ready for the separation and decoding of data broadcasting.

The remote controller 200 will be described below.

Figure 3:
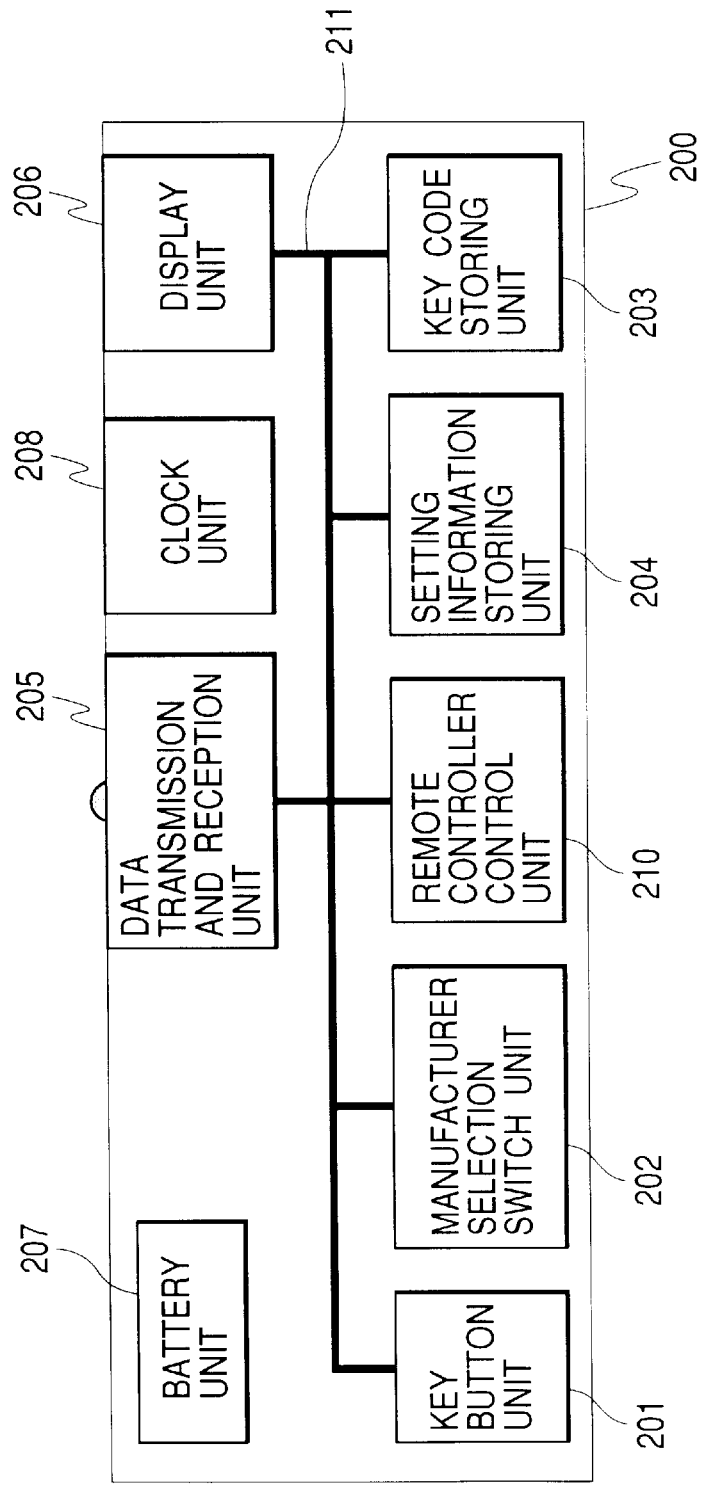
FIG. 3 is a diagram showing a configuration of a remote control device to which the present invention is applied.

FIG. 3 is a diagram showing a configuration of the remote controller 200.

In FIG. 3, numeral 201 designates a key button unit, which is provided with various control keys shown in FIGS. 4A and 4B, and which enables the user to manipulate each control key of this key button unit 201, thereby making the TV receiver 100 of FIG. 2 execute a desired operation. Numeral 202 denotes a manufacturer selection switch unit, which permits the user to select manufacturers of TV receivers to be controlled by the remote controller 200. Numeral 203 represents a key code storing unit, which stores remote controller key codes for operation and setting of TV receivers of respective manufacturers that can be selected by the manufacturer selection switch unit 202.

Numeral 204 denotes a setting information storing unit, which stores setting information sent from the TV receiver 100, as described hereinafter, in correspondence to the originating TV receiver. Numeral 205 indicates a data transmission and reception unit, which transmits to the TV receiver data such as key codes according to various keys manipulated by the user, a reception completion code, the TV setting information stored in the setting information storing unit 204, and so on. The data transmission and reception unit 205 also receives data such as the TV setting information, the reception completion code, etc., transmitted from the TV receiver.

Numeral 206 represents a display unit, which performs display for confirmation of transmission/reception of the TV setting information, display upon setting of a manufacturer by the manufacturer selection switch 202, and so on. Numeral 207 stands for a battery unit, which supplies power to each unit of the remote controller 200. Numeral 208 indicates a clock unit, which determines the present date, time, and day of the week and which displays such information on the display unit 206.

Numeral 210 designates a remote controller control unit, which controls the action of each unit of the remote controller 200 in manipulation on the key button unit 201 and in setting operation by the manufacturer selection switch unit 202, and which stores the TV setting information received by the data transmission and reception unit 205, through the bus 211 in the setting information storing unit 204.

FIGS. 4A and 4B are views showing the appearance of the remote controller 200.

As shown in FIG. 4B, a TV changeover switch 201a is provided on a side face of the remote controller 200. The changeover switch 201a is configured to allow the setting at three positions of switch 1, switch 2, and switch 3 and in the present embodiment the switch is arranged to set TV manufacturers corresponding to the respective positions. A manufacturer of a TV receiver to be controlled by the remote controller 200 is set through changeover of this switch 201 a and a remote controller key code corresponding to the set manufacturer is transmitted and received.

The operation of setting a manufacturer to each switch position of the switch 201a is carried out using the later-described keys of menu key 201f, execute key 201g, cursor keys 201h, and cancel key 201j, and the display unit 206.

Symbol 201b represents a power key for providing instructions for on/off of power to the TV receiver. Keys 201c on the right side of the power key 201b are keys for selection of receiving sources of the TV receiver, and the TV receiver receives VHF or UHF through manipulation of the TV key, BS broadcasting through manipulation of the BS key, and CS broadcasting through manipulation of the CS key.

A set key 201d is located below the power key 201b and manipulation of this set key 201d will result in transmitting the TV setting information stored in the setting information storing unit 204 of FIG. 3, to the TV receiver. The display unit 206 is provided below the set key 201d.

The menu key 201f is a key for display of a menu screen of various settings and operations of the TV receiver and various settings can be made on the menu screen through manipulation of the execute key 201g, cursor key 201h, and cancel keys 201j. Reference label 201i represents volume keys for controlling the sound volume of the TV receiver.

Symbol 201k indicates a ten-key numerical keypad, which is used for ordinary selection of TV channels and also for entry of numerals in the menu screen. Arrow keys 2011 are used for changing the TV channels up and down.

Processing associated with reception and transmission of TV setting information according to the present embodiment will be described below.

In the present embodiment, the remote controller 200 is assumed to be set in such a manner that switch 1 in the manufacturer selection switch 201a corresponds to the TV receiver 100, switch 2 to the TV receiver 100', and switch 3 to the TV receiver 100".

Figures 5, 6:
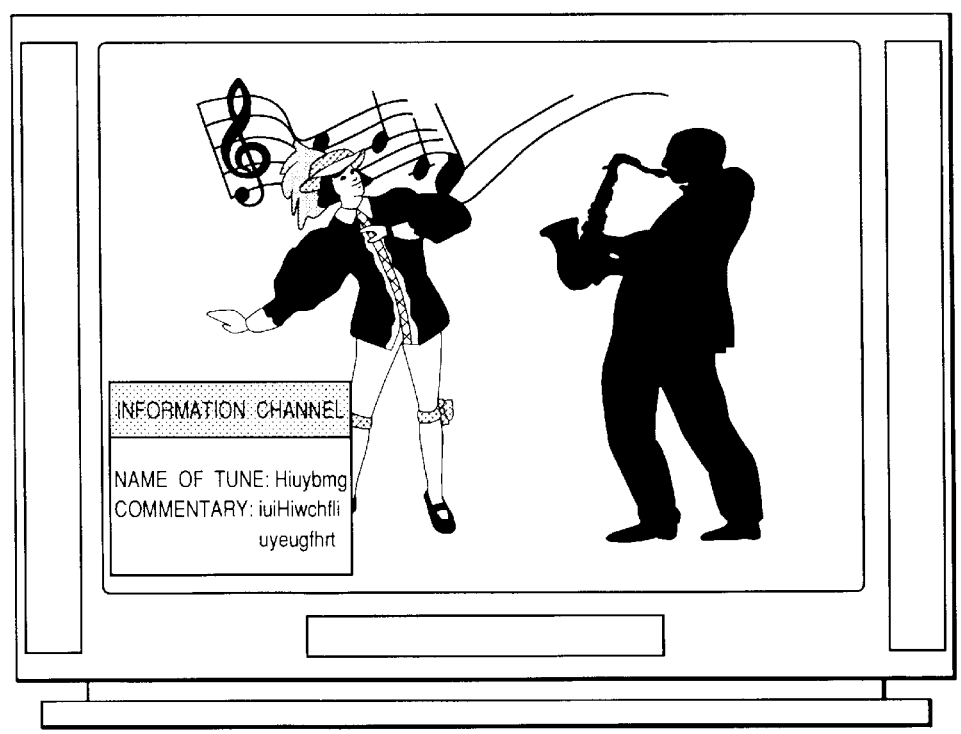
FIG. 5 is a diagram showing the contents of TV setting information used in an embodiment of the present invention.
FIG. 6 is a view showing a state of a display screen presented by the signal receiver of FIG. 2.

It is also assumed that the user is subscribing to 16 channels of BS broadcasting in a stereo mode and also to 29 channels of data broadcasting in the TV receiver 100. Accordingly, the manufacturer selection switch 201a at this time is set at switch 1 corresponding to the TV receiver 100 and the setting information indicating the current setting conditions shown in FIG. 5 is stored in the memory unit 111 of the TV receiver 100. FIG. 6 shows a display screen of a currently selected program and a data broadcast in the TV receiver 100. In FIG. 6, the broadcasting station and the channel of these display images are not displayed on this screen at present, because they are unnecessary for and obstructive to viewing of the program.

The processing associated with transmission/reception of TV setting information in the present embodiment will be described below.

Let us explain here a situation in which the user breaks off viewing of a TV broadcast program on the TV receiver 100 of FIG. 1 and starts viewing the rest of the same program on the TV receiver 100' located in another room. The user first manipulates the power key 201b of the remote controller 200 to switch off the power switch of the TV receiver now presenting the TV program.

Figure 7:
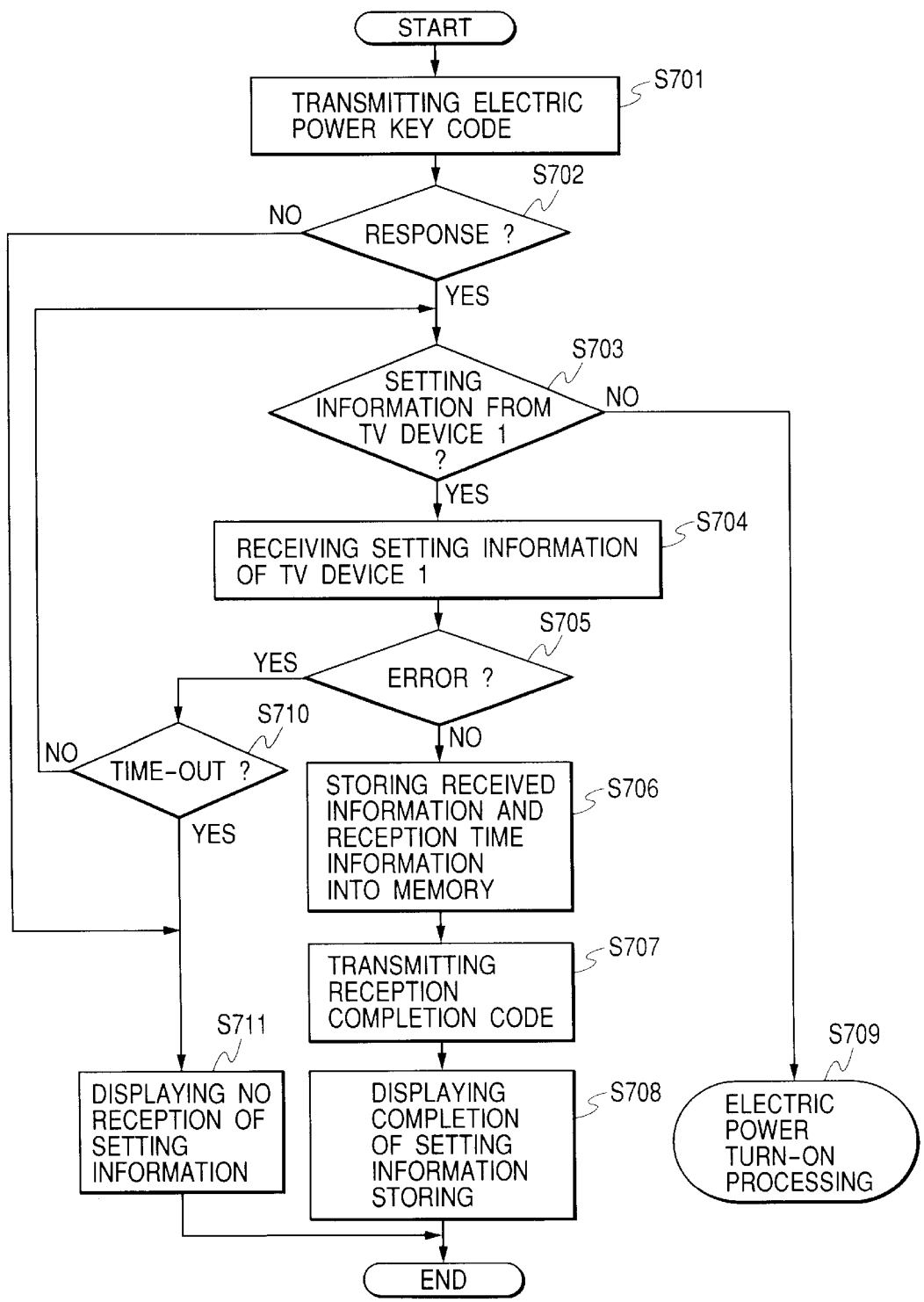
FIG. 7 is a flowchart for explaining the operation of the remote control device according to an embodiment of the present invention.

FIG. 7 is a flowchart showing the operation on the remote control 200 side, which is performed in conjunction with the manipulation of the power key 201 of the remote controller 200. This operation of FIG. 7 is controlled by the remote controller control unit 210 of FIG. 3.

When the power key 201b is manipulated, a command for executing the manipulation of the power key according to the manufacturer code corresponding to the TV receiver 100 is read out of the key code storing unit 203 and is transmitted from the data transmission and reception unit 205 to the TV receiver 100 (S701). Then the control unit awaits transmission of a response code from the TV receiver 100 (S702). In the present embodiment, when a power-off instruction is given through the manipulation of the power key 201b, the TV receiver 100 sends the TV setting information instead of the response code. With a power-on instruction the TV receiver 100 sends the normal response code.

Then the control unit determines whether this TV setting information also serving as a response is transmitted from the TV receiver 100 (S703). When it is transmitted, the control unit receives it (S704). Then the control unit checks whether the received data involves an error (S705). If there is an error and if it is within a time-out period (S710), the data is received again. In the present embodiment, an internal timer starts counting according to the manipulation of the power key 201b and a response is awaited from the TV receiver 100 before this count value reaches a predetermined value.

When the TV setting information from the TV receiver 100 is received without an error, the present date and time data is detected as a date and time of reception of this TV setting information from the clock unit 207 and is stored together with the just received TV setting information in the setting information storing unit 204 (S706). Then a predetermined reception completion code is sent from the data transmission and reception unit 205 (S707) and a message indicating the completion of reception of the TV setting information of the TV receiver 100 is displayed on the display unit 206 to end the processing (S708).

When time-out occurs at S710, an incompletion message indicating incompletion of reception of the TV setting information is displayed on the display unit 206 to end the processing (S711).

When at S703 there is a response from the TV receiver 100 but it is not the TV setting information, the response is a power-on instruction and thus a power-on routine is carried out according to FIG. 9 described hereinafter. When there is no response from the TV receiver 100 at S702, the incompletion message of the TV setting information is displayed on the display unit 206 to end the processing.

Figure 8:
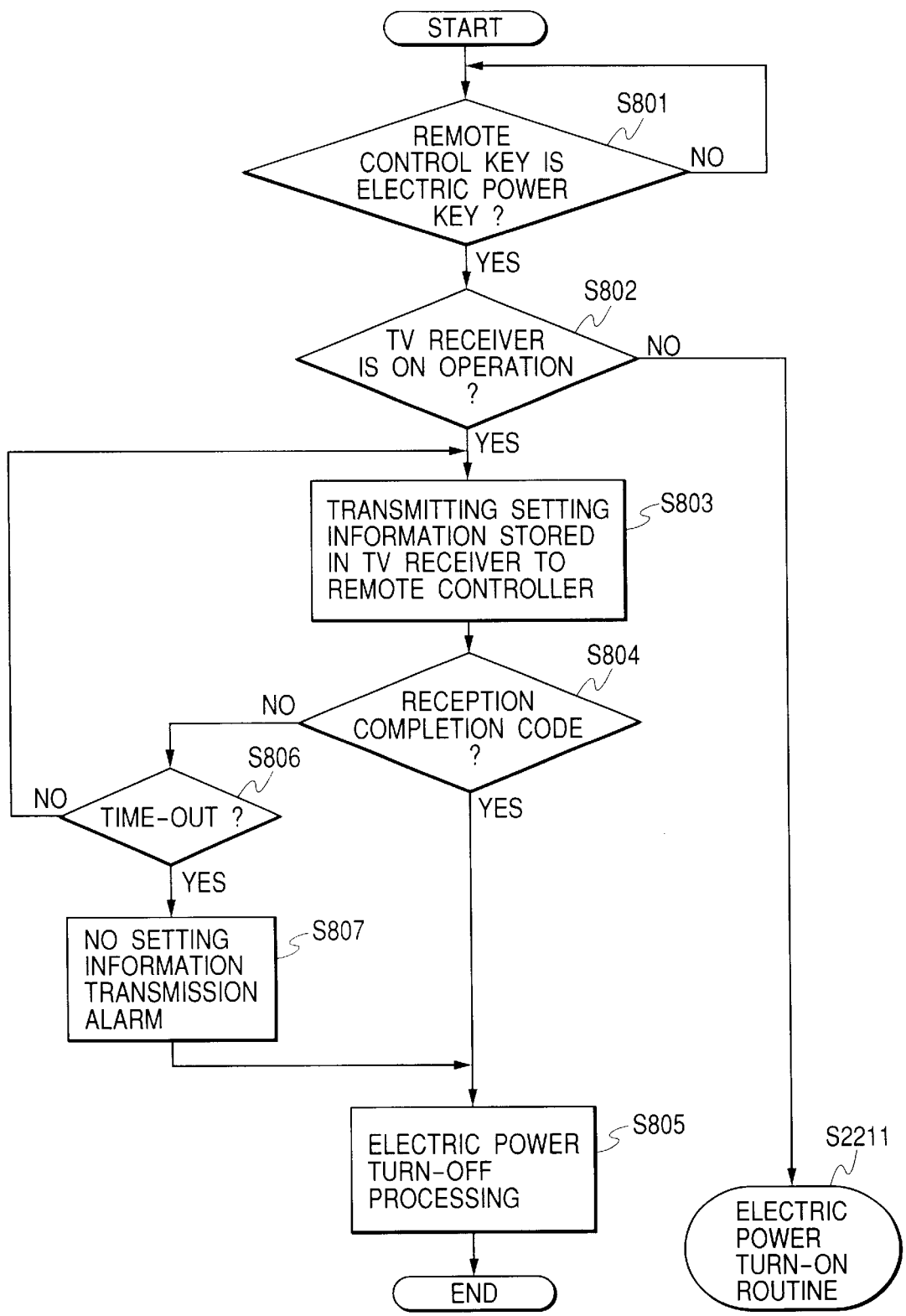
FIG. 8 is a flowchart for explaining the operation of the signal receiver according to an embodiment of the present invention.

The operation of the TV receiver 100 to carry out a power-off process with reception of the power key command from the remote controller 200 will be described below referring to the flowchart of FIG. 8. The processing of FIG. 8 is controlled by the control unit 109 of FIG. 1.

On the TV receiver 100 side, when receiving the power key code from the remote controller 200 (S801), the control unit 109 determines whether the TV receiver 100 is in operation. When it is in operation, the TV setting information shown in FIG. 5, which is stored in the memory unit 111, is sent as a response code from the remote controller control unit 108 to the remote controller 200 (S803). In the present embodiment, after receiving the power key command from the remote controller 200, the control unit 109 starts counting the time by an internal timer (not shown) and repeatedly sends the TV setting information to the remote controller 200 before a reception completion code is sent from the remote controller 200 (S804) or before the count value reaches a value corresponding to the time-out period (S806).

When the reception completion code is received before occurrence of time-out, the control unit performs a power-off process of powering off the TV receiver 100 (S805) and then ends the processing. When the reception completion code is not received within the time-out period, the control unit assumes that the transmission of the TV setting information to the remote controller 200 was unsuccessful, controls the audio control unit 104 to output an incompletion alarm sound noting incompletion of transmission of the TV setting information, from the speaker unit 105 (S807), and thereafter performs the power-off process to end the processing.

When it is determined at S802 that the TV receiver 100 is not in operation, a power-on routine is executed according to FIG. 10 described hereinafter.

Next described is a case in which the user uses the TV receiver 100' of FIG. 1 to watch the rest of the program having been viewed heretofore on the TV receiver 100. On this occasion, the user sets the changeover switch 201a of the remote controller 200 to switch 2 corresponding to the TV receiver 100'. Then the user manipulates the power key 201b of the remote controller 200 for the TV receiver 100'.

Figure 9:
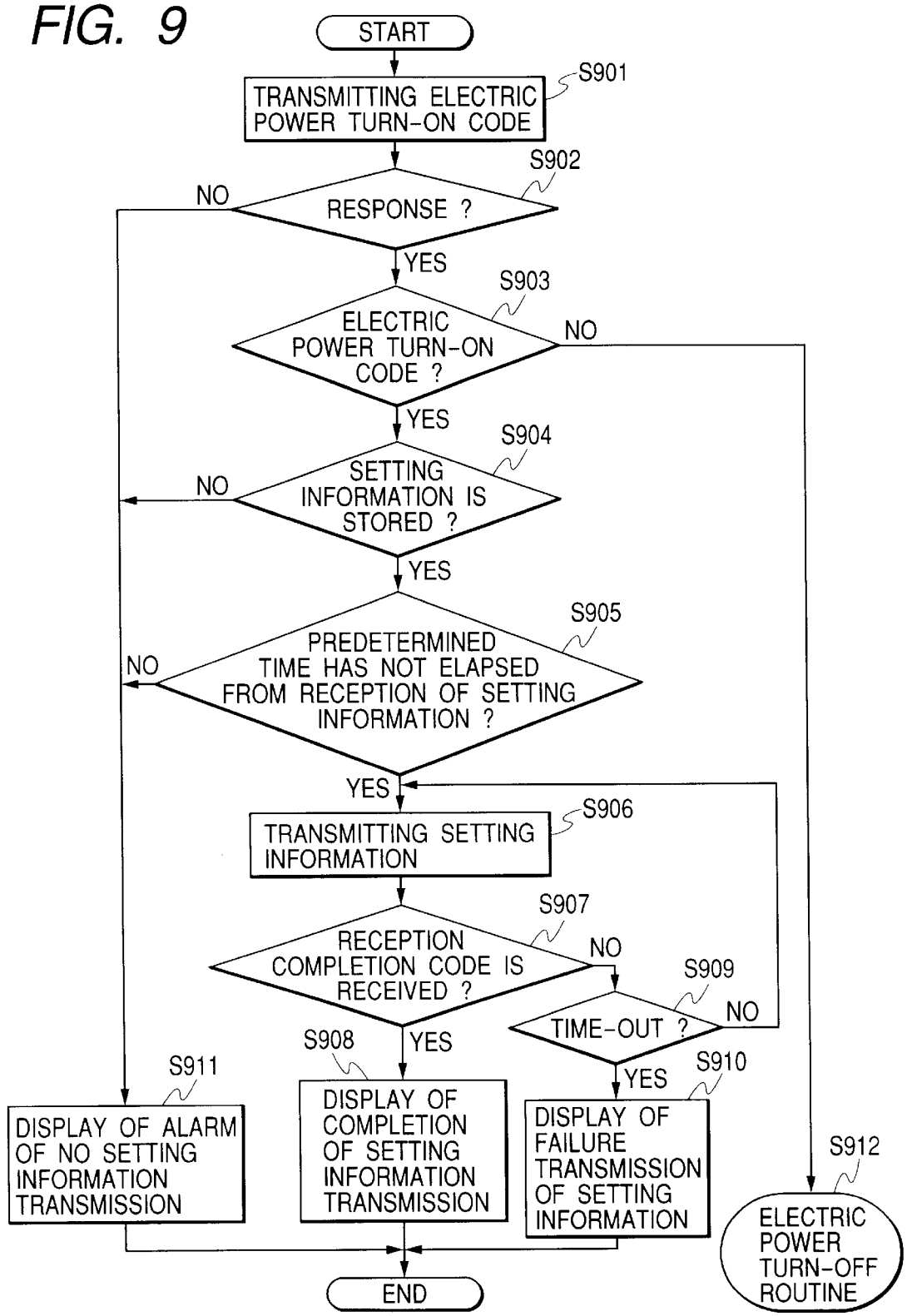
FIG. 9 is a flowchart for explaining the operation of the remote controller according to an embodiment of the present invention.
Figure 10:
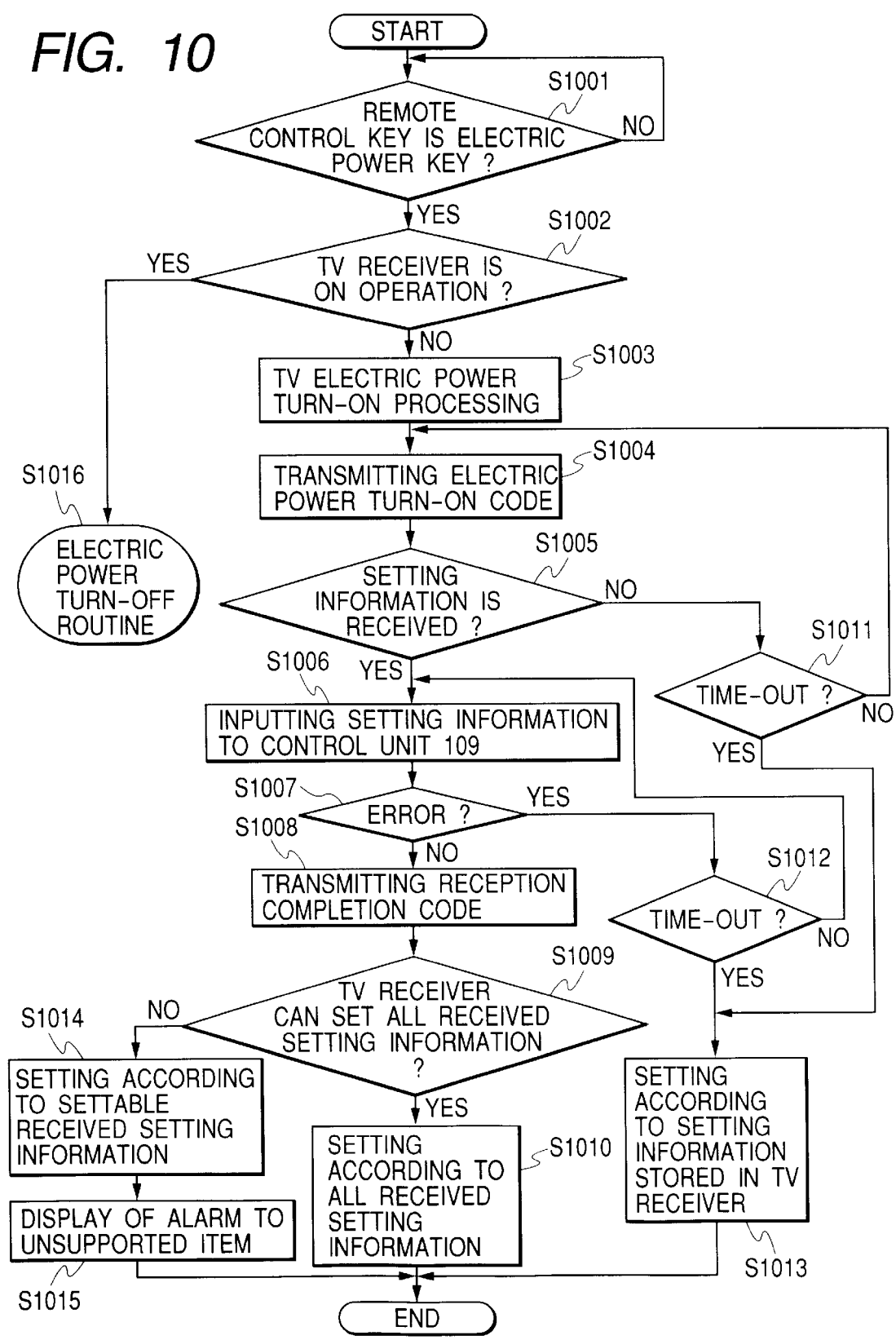
FIG. 10 is a flowchart for explaining the operation of the signal receiver according to an embodiment of the present invention.

FIG. 9 is a flowchart showing the operation of the remote controller 200 carried out in response to a power-on instruction for activating the TV receiver 100' through manipulation of the power key 201b of the remote controller 200, and FIG. 10 a flowchart showing the operation of the TV receiver 100' to carry out the power-on process similarly in response to the instruction from the remote controller 200.

In FIG. 9, when the power key 201b is manipulated, the remote controller 200 reads the power key code according to the manufacturer code of the TV receiver 100' out of the key code storing unit 203 and transmits it from the data transmission and reception unit 205 (S901), and then awaits a response from the TV receiver 100' (S902).

When receiving the power-on code as a response from the TV receiver 100' (S903), the remote controller control unit 210 determines whether the TV setting information is stored in the setting information storing unit 204 (S904). When the TV setting information is stored, the control unit detects the present date and time data from the clock unit 207, compares it with date and time data added to the setting information stored in the setting information storing unit 204, and checks whether a difference between them is within a predetermined time (S905).

If the result is that the difference between the present date and time and the date and time of reception of the TV setting information stored in the setting information storing unit 204 is within the predetermined time, the control unit reads the TV setting information stored in the setting information storing unit 204 and sends it to the TV receiver 100' through the data transmission and reception unit 205 (S906). In the present embodiment, a timer (not shown) starts counting the time according to the start of the transmission of the TV setting information and the TV setting information is repeatedly sent to the TV receiver 100' until a reception completion code is transmitted from the TV receiver 100' (S907) or until the count value of the timer exceeds a count value according to the predetermined time-out period (S909).

When the reception completion code transmitted from the TV receiver 100' is then received to confirm completion of transmission of the TV setting information to the TV receiver 100', a message indicating the completion of transmission of the TV setting information is displayed on the display unit 206 at S908 and the processing is ended.

When at S909 time-out occurs before reception of the reception completion code of the TV setting information from the TV receiver 100', an alarm indicating a failure in transmission of the TV setting information is displayed on the display unit 206 (S910) and the processing is then terminated.

When there is no response at S902, when the TV setting information is not stored in the setting information storing unit 204 at S904, or when the difference between the present date and time and the date and time of the TV setting information stored in the setting information storing unit 204 is over the predetermined time at S905, i.e., when a time over the predetermined time has elapsed since the reception of the TV setting information, a message indicating no transmission of the TV setting information is displayed on the display unit 206 (S911) and the processing is terminated.

In FIG. 10 showing the operation of the TV receiver 100' on the other hand, when the power key code is received from the remote controller 200 (S1001), the control unit 109 determines whether the TV receiver 100' is in a power-off state (S1002). When the TV receiver 100' is judged in the power-off state, the power-on process of the TV receiver 100' is first carried out to receive the TV broadcast signals, display images, and output sound (S1003).

Then the power-on code is transmitted as a response to the remote controller 200 (S1004) and the control unit keeps transmitting the power-on code within the time-out period before the TV setting information is transmitted from the remote controller 200 (S1005, S1011).

When the remote controller control unit 108 receives the TV setting information, the control unit 109 reads in this TV setting information (S1006) and checks whether there is an error (S1007). If there is an error at this point, the TV setting information is again read in from the remote controller control unit 108 within the time-out period (S1012).

When the reception of TV setting information is completed without an error, the control unit transmits the reception completion code as a response to the remote controller 200 (S1008).

Then the control unit 109 determines whether it is possible to implement all the operation settings according to the received TV setting information in this TV receiver (S1009). If possible, the control unit enables the operation settings of the TV receiver according to this TV setting information (S1010) and then ends the setting process in the power-on routine.

If there is setting information incapable of being set, only setting information capable of being set is set (S1014) and an alarm of incapability of setting is displayed for the setting information incapable of being set (S1015). Then, the setting in the power-on routine is ended.

If the control unit fails to receive the TV setting information at S1011 or at S1012, the setting is made according to predetermined operation settings stored in the memory unit 111 in the TV receiver (S1013).

Figure 11:
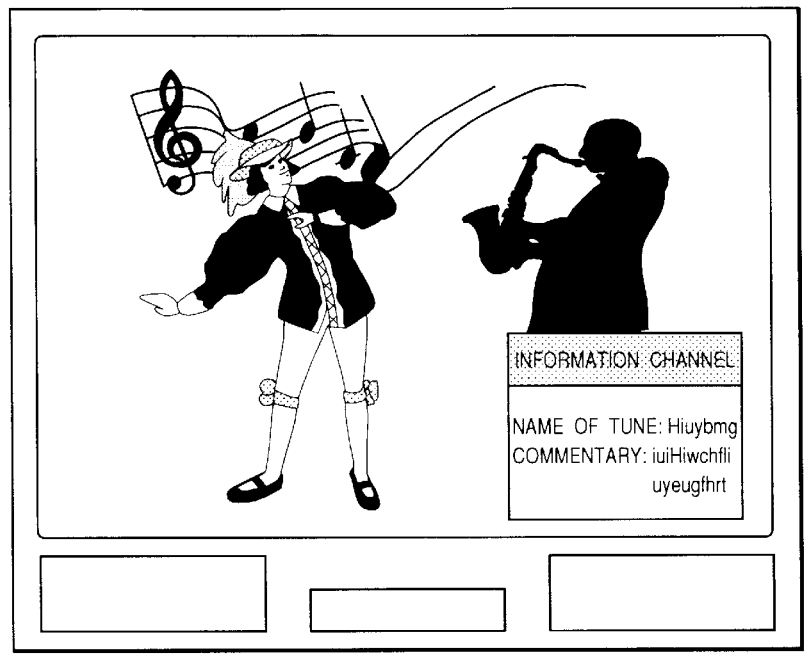
FIG. 11 is a view showing a state of a display screen of the signal receiver according to an embodiment of the present invention.

Since in the present embodiment the TV receiver 100' has functions equivalent to those of the TV receiver 100, all the settings according to the TV setting information of the TV receiver 100 are valid and the TV receiver 100' thus set receives the same program as in FIG. 6, as shown in FIG. 11.

Figure 12:
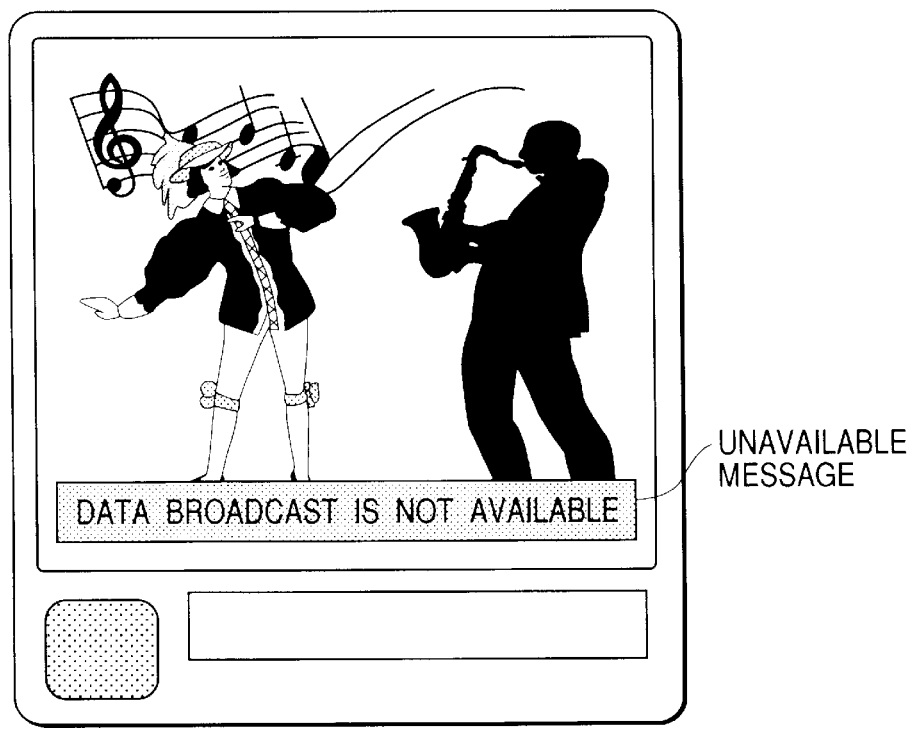
FIG. 12 is a view showing a state of a display screen of the signal receiver according to an embodiment of the present invention.

On the other hand, the TV receiver 100" does not support the function of receiving the data broadcasting, as described previously. When the TV setting information as shown in FIG. 5 is transmitted from the remote controller 200 to the TV receiver 100", only the setting of 16 channels of BS broadcasting is enabled. As a result, the TV receiver 100" selects the program out of the 16 BS channels and displays the images thereof, while also displaying a message indicating that the 29 channels of data broadcasting are unavailable for display, as shown in FIG. 12.

When the power-on instruction for the TV receiver 100" is given from the remote controller 200 in this way, the processing is also similar to the foregoing processing for the TV receiver 100' shown in FIG. 9 and FIG. 10. At this time, however, the changeover switch 201a of the remote controller 200 needs to be set at switch 3 corresponding to the TV receiver 100".

The TV receiver 100 also received the 29 channels of data broadcasting, whereas the TV receiver 100" cannot receive them because it does not support the data broadcast receiving function.

For this reason, the received TV setting information includes unavailable settings at S1009 of FIG. 10 and thus the control unit goes to S1014 to set only the available setting information. As for the unavailable settings, the alarm of unavailable setting is displayed as shown in FIG. 12.

Described below is the processing where the TV setting information is transmitted to the TV receiver through manipulation of the set key 201d of the remote controller 200.

Figure 13:
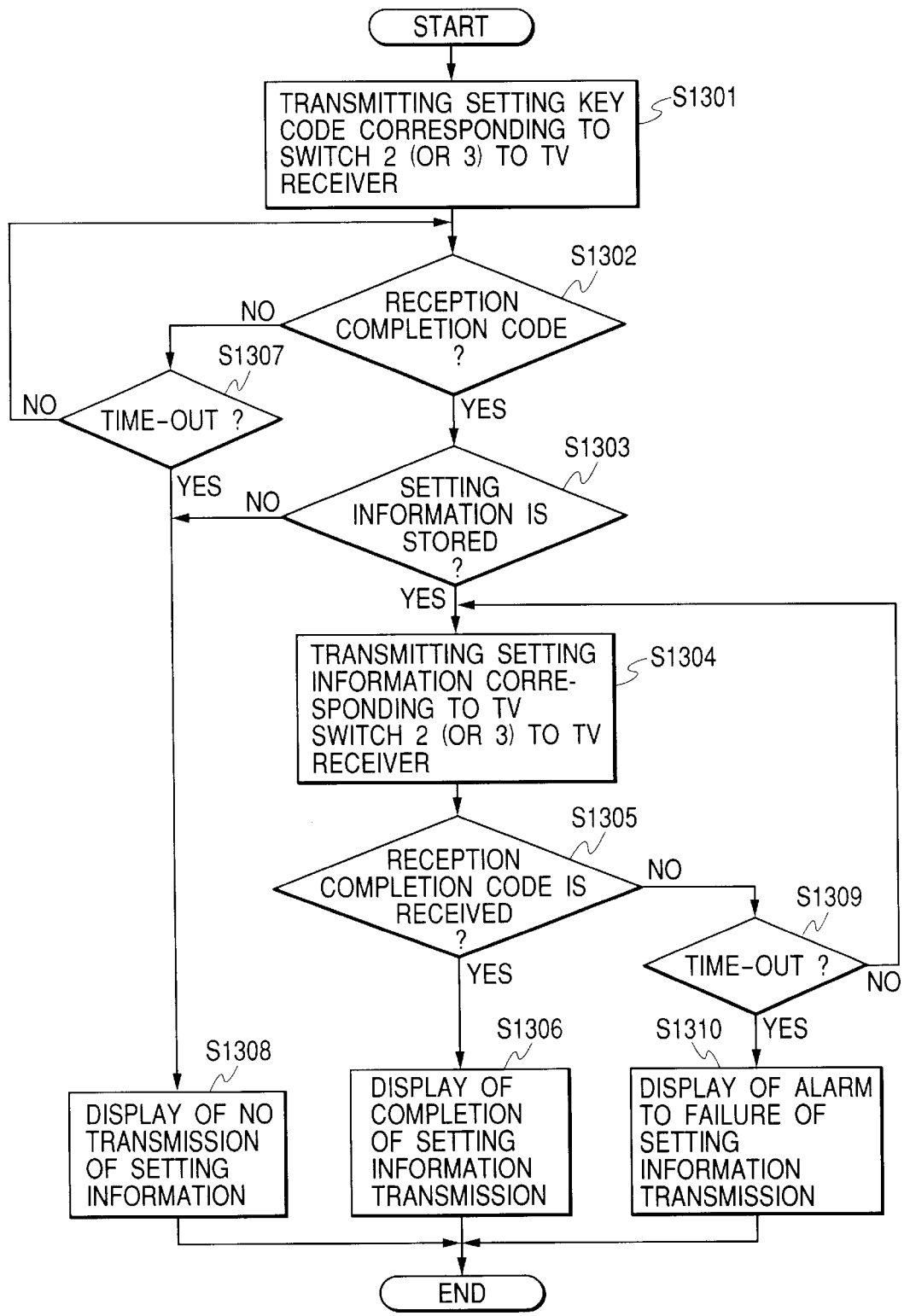
FIG. 13 is a flowchart for explaining the operation of the remote controller according to an embodiment of the present invention.

FIG. 13 is a flowchart showing the operation of the remote controller 200 carried out when the user manipulates the set key 201d of the remote controller 200 after activation of the TV receiver.

In FIG. 13, when the user manipulates the set key 201d, the remote controller control unit 210 of the remote controller 200 controls the data transmission and reception unit 205 to transmit the set key code according to the manufacturer code corresponding to the position of the changeover switch 201a (S1301) and then awaits the reception completion code from the TV receiver (S1302). The TV setting information is repeatedly transmitted before the reception completion code is sent from the TV receiver or before time-out occurs (S1302, S1307).

When receiving the reception completion code from the TV receiver, the remote controller control unit 210 checks whether the TV setting information is stored in the setting information storing unit 204 (S1303). If stored, the control unit reads the TV setting information stored in the setting information storing unit 204 and controls the data transmission and reception unit 205 to transmit the data to the TV receiver (S1304). After this, the TV setting information is repeatedly transmitted before the reception completion code is received from the TV receiver (S1305) or before time-out occurs (S1309).

When the reception completion code is received to confirm completion of the transmission of the TV setting information to the TV receiver, the control unit displays a message indicating the completion of transmission of the TV setting information, on the display unit 206, and then ends the processing (S1306).

When at S1309 time-out occurs without reception of the reception completion code from the TV receiver for some reason, e.g., because of a transmission error, the control unit displays an alarm indicating a failure in the transmission of TV setting information to the TV receiver, on the display unit 206 and then terminates the processing (S1310).

When at S1307 the reception completion code is not transmitted from the TV receiver or when at S1303 the TV setting information is not stored in the setting information storing unit 204, the control unit displays a message indicating no transmission of TV setting information, on the display unit 206 and terminates the processing (S1308).

Figure 14:
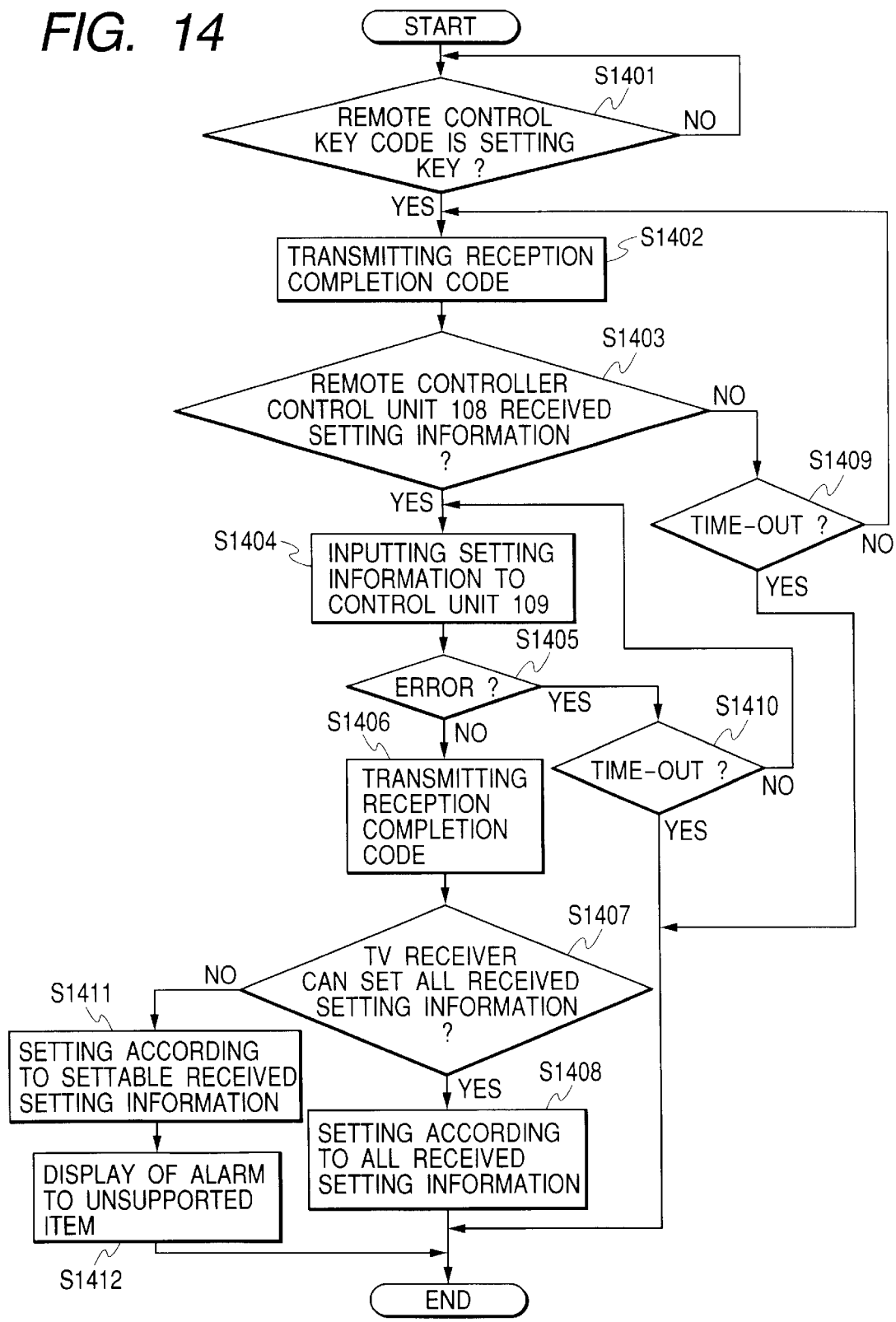
FIG. 14 is a flowchart for explaining the operation of the signal receiver according to an embodiment of the present invention.

The operation of the TV receiver associated with the manipulation of the set key 201d will be described below. FIG. 14 is a flowchart showing the processing associated with the manipulation of the set key 201d in the TV receiver 100 to 100".

In FIG. 14, when receiving the key code of the set key 201d from the remote controller 200 (S1401), the control unit 109 controls the remote controller control unit 108 to send the reception completion code to the remote controller 200 (S1402). Then the reception completion code is repeatedly transmitted within the time-out period before the TV setting information is transmitted as a response from the remote controller 200 (S1403, S1404).

When receiving the TV setting information through the remote controller control unit 108, the control unit 109 reads in this TV setting information (S1404) and checks whether there is an error (S1405). If there is an error at this point, the control unit again reads in the TV setting information from the remote controller control unit 108 within the time-out period (S1410).

If the reception of the TV setting information is completed without an error, the reception completion code is transmitted as a response to the remote controller 200 (S1406).

Then the control unit 109 determines whether it is possible to implement all the operation settings according to the received TV setting information in this TV receiver (S1407). If possible, the control unit enables the operation settings of the TV receiver according to this TV setting information and terminates the processing (S1408).

When there is setting information incapable of being set, only setting information capable of being set is set (S1411). As for the setting information incapable of being set, an alarm indicating the incapability of setting is displayed (S1412) and the setting in the power-on routine is ended. When the TV setting information is not received at S1409 or at S1410, the processing is ended immediately.

By manipulating the set key 201d in this way, the TV setting information stored in the remote controller 200 can be transmitted at any timing except for the time of power-on operation to the TV receiver, whereby the operation conditions of the TV receiver can be set based thereon.

For example, during the power-on operations described with FIG. 9 and FIG. 10, the TV setting information is not transmitted to the TV receiver when the TV setting information stored in the remote controller 200 is old. When the user desires to set the operation conditions of the TV receiver, using the previous TV setting information over the predetermined time before the present date and time, the user can send the old TV setting information by manipulating the set key.

In the present embodiment, as described above, when the power-off command for the TV receiver is given through the remote controller, the TV setting information indicating the setting conditions of the presently active channel, etc., in the TV receiver is automatically sent to and stored in the remote controller. When another TV receiver is then powered on by use of this remote controller, the TV setting information thus stored is sent to this TV receiver and the TV receiver enables the operation settings according to the received TV setting information, so as to be able to reproduce the operation setting conditions heretofore readily.

Accordingly, when the user desires to watch the presently viewed program on another TV receiver, the user can reproduce the same program and operation conditions by simply switching the power switch of the TV receiver on through the remote controller, without having to remember each of the setting conditions including the channel number and other information/conditions.

By displaying the unavailability of setting because of the difference in functions among TV receivers, when there is a function unavailable for setting in another TV receiver, the user can be informed of the fact.

By manipulating the set key at arbitrary timing except for the power-on timing, the user can readily reproduce the operation setting conditions of the TV receiver for a previously viewing program.

Even if the TV receivers are not connected through a network, the operation setting conditions of each TV receiver can be freely transmitted and received through the remote controller among the TV receivers.

The foregoing embodiments were described as examples of transmitting and receiving the information of the channel number, the broadcasting service thereof, and the audio mode, as shown in FIG. 5, as the TV setting information, but configurations other than the examples can be employed; for example, information of brightness and hues of the screen and the volume and quality of sound, etc., can be transmitted and received as the TV setting information.

The foregoing embodiments were configurations arranged to transmit TV setting information from the TV receiver to the remote controller in a power-off operation through manipulation of the power key, but the invention is not limited to such configurations; for example, when a channel changeover instruction is given through the remote controller, the TV setting information may be similarly transmitted to the remote controller. In another configuration, there is provided a dedicated key for transmitting the TV setting information from the TV receiver to the remote controller, and the TV setting information is transmitted to the remote controller according to manipulation of the dedicated key.

In the foregoing embodiments the present invention was described with respect to application of the invention to a system using TV receivers, but the present invention can also be applied to other systems, e.g., to systems for operating and controlling electronic devices of the same kind by a common remote controller, while presenting similar effects.

As described above, the present invention makes it feasible to effect the setting of arbitrary operation conditions readily between devices.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal receiving apparatus controlled by a remote controller, comprising:

signal receiving means for receiving television signals;

processing means for processing the television signals received by said signal receiving means, to obtain image signals;

display means for displaying images according to the image signals obtained by said processing means;

transmitting and receiving means for receiving information transmitted from said remote controller and transmitting information to said remote controller; and control means for controlling operation conditions of said signal receiving apparatus, based on setting information concerning operation setting conditions of another signal receiving apparatus, which is transmitted from said remote controller and received by said transmitting and receiving means.

2. A signal receiving apparatus according to claim 1, wherein after transmitting the setting information to said remote controller, said control means determines whether a predetermined code has been transmitted from said remote controller within a predetermined period and determines whether the setting information has successfully been transmitted, based on a result of the determination.

3. A signal receiving apparatus according to claim 1, wherein said control means controls the operation conditions of said signal receiving apparatus in accordance with the setting information transmitted in conjunction with a power-on command from said remote controller.

4. A signal receiving apparatus according to claim 3, wherein when the setting information is not transmitted from said remote controller within a predetermined period after reception of the power-on command transmitted from said remote controller, said control means controls the operation conditions of said signal receiving apparatus toward predetermined operation conditions.

5. A signal receiving apparatus according to claim 1, wherein said control means controls the operation conditions of said signal receiving apparatus in accordance with the setting information transmitted in conjunction with a command according to a manipulation of a predetermined key of said remote controller.

6. A signal receiving apparatus according to claim 5, wherein when the setting information is not transmitted from said remote controller within a predetermined period after reception of the command corresponding to said manipulation of the predetermined key, said control means controls the operation conditions of said signal receiving apparatus toward predetermined operation conditions.

7. A signal receiving apparatus according to claim 1, wherein when an operation setting designated in the received setting information is unavailable, said control means controls said display means to display an indication of unavailability thereof.

8. A signal receiving apparatus according to claim 1, wherein the setting information includes channel information indicating a channel number of the television signals and said control means selects a channel to be received by said receiving means, according to said received channel information.

9. A signal receiving apparatus according to claim 1, wherein when only some setting functions can be set out of a plurality of setting functions designated in the received setting information, said control means sets operation conditions according to the setting information only for those setting functions.

10. A signal receiving apparatus according to claim 1, wherein when the setting information has not been successfully transmitted to said remote controller, said control means further outputs a predetermined alarm sound from a speaker unit.

11. A remote controller controlling a signal receiving apparatus which receives television signals and display images according to the television signals, comprising:

transmitting and receiving means for receiving information transmitted from said signal receiving apparatus and transmitting information to said signal receiving apparatus;

storage means for storing setting information concerning operation setting conditions of a predetermined signal receiving apparatus, transmitted from said predetermined signal receiving apparatus and received by said transmitting and receiving means; and control means for controlling said transmitting and receiving means to transmit the setting information of said predetermined signal receiving apparatus stored in said storage means, to another signal receiving apparatus, wherein the setting information is transmitted in order to change operation setting conditions of said another signal receiving apparatus into a state according to the operation setting conditions of said predetermined signal receiving apparatus.

12. A remote controller according to claim 11, wherein said control means controls said transmitting and receiving means so as to transmit the setting information to said another signal receiving apparatus in accordance with a manipulation of a predetermined key.

13. A remote controller according to claim 12, wherein said control means controls said transmitting and receiving means so as to transmit the setting information only when manipulation of said predetermined key is executed within a predetermined period after reception of the setting information from said predetermined signal receiving apparatus.

14. A remote controller according to claim 12, wherein said storage means also stores information about a date and time of reception of the setting information from said predetermined signal receiving apparatus, and said control means determines whether the setting information is to be transmitted to said another signal receiving apparatus, based on a result of comparison between the date and time stored in said storage means and a date and time when the manipulation of said predetermined key has been executed.

15. A remote controller according to claim 12, wherein said predetermined key is a power key.

16. A remote controller according to claim 11, further comprising:

a key code storing unit adapted to store a command key code corresponding to said predetermined signal receiving apparatus and a command key code corresponding to said another signal receiving apparatus, wherein said predetermined signal receiving apparatus and said another signal receiving apparatus can be controlled by respective command key codes.

17. A remote controller according to claim 16, further comprising:

a set switch adapted to set a signal receiving apparatus to be controlled, wherein said control means selects a command key code stored in said key code storing unit in accordance with a setting state of the set switch.

18. A signal receiving system including a signal receiver, receiving television signals and displaying images according to the television signals, and a remote controller controlling the signal receiver, comprising:

transmitting means for transmitting setting information concerning operation setting conditions of said signal receiver from said signal receiver to said remote controller in accordance with a power-off instruction given through said remote controller;

processing means for performing a power-off process of powering off said signal receiving apparatus in accordance with the power-off instruction; and storage means for storing the setting information transmitted from said signal receiver, in said remote controller, wherein in order to bring another signal receiver into the operation setting conditions according to the setting information, the setting information stored in said remote controller is transmitted from said remote controller to said another signal receiver.

19. A method of controlling a television signal receiving system including a signal receiver, receiving television signals and displaying images according to the television signals, and a remote controller controlling the signal receiver, comprising the steps of:

transmitting setting information concerning operation setting conditions of the signal receiver from the signal receiver to the remote controller in accordance with a power-off instruction given through the remote controller;

performing a power-off process of powering off the signal receiver in accordance with the power-off instruction;

storing the setting information transmitted from the signal receiver, in the remote controller; and transmitting the setting information stored in the remote controller, to another signal receiver, thereby bringing the another signal receiver into the operation setting conditions according to the setting information.

20. A remote controller for controlling one apparatus and another apparatus, comprising:

signal receiving means for receiving setting information concerning operation setting conditions of said one apparatus, transmitted from said one apparatus;

storage means for storing the setting information of said one apparatus; and transmitting means for transmitting the setting information of said one apparatus stored in said storage means, to said another apparatus, wherein the setting information is transmitted to said another apparatus in order to change operation setting conditions of said another apparatus into the operation setting conditions of said one apparatus.

* * * * *

UNITED STATES PATENT AND TRADEMARK OFFICE
CERTIFICATE OF CORRECTION

PATENT NO.   : 6,795,130 B2
DATED        : September 21, 2004
INVENTOR(S)  : Yoshikazu Shibamiya It is certified that error appears in the above-identified patent and that said Letters Patent is hereby corrected as shown below:

Column 5,
Line 20, "switch 201" should read -- switch 201a --.
Line 21, "a" (first occurrence) should be deleted.

Column 7,
Line 45, "FIG. 10" should read -- FIG. 10 is --.

Signed and Sealed this

Twenty-first Day of June, 2005

JON W. DUDAS
*Director of the United States Patent and Trademark Office*